United States Patent
Huntley

[11] 4,015,206
[45] Mar. 29, 1977

[54] PROTECTIVE RELAYING MODEM RECEIVER

[75] Inventor: Christopher Ryland Huntley, Burnaby, Canada

[73] Assignee: GTE Lenkurt (Canada) Ltd., Burnaby, Canada

[22] Filed: Dec. 22, 1975

[21] Appl. No.: 643,166

[52] U.S. Cl. .............................. 325/435; 325/320; 325/434; 325/430; 325/402; 325/2; 340/167 A

[51] Int. Cl.$^2$ ......................................... H04B 1/16

[58] Field of Search ............ 325/2, 402, 320, 430, 325/431, 434, 435; 340/171 PF, 167 R, 167 A, 167 B; 178/88, 66 R; 317/27 A, 27 R; 179/2 A, 2 B, 175.3 R; 324/51

[56] References Cited

UNITED STATES PATENTS

| | | | |
|---|---|---|---|
| 2,715,677 | 8/1955 | Turner | 325/431 |
| 2,955,199 | 10/1960 | Mindes | 325/435 |
| 3,641,438 | 2/1972 | Canty | 325/430 |
| 3,671,939 | 6/1972 | Trimble | 340/167 A |
| 3,895,187 | 7/1975 | Antoszewski | 325/320 |

Primary Examiner—Howard W. Britton
Assistant Examiner—Tommy P. Chin
Attorney, Agent, or Firm—Douglas M. Gilbert

[57] ABSTRACT

A receiver is provided for utilization in a protective relaying modem to effectively distinguish between two mutually exclusive signal frequencies in a given frequency channel and which are respectively indicative of a "fault" or "no-fault" condition in a remote power transmission line. The received signals are coupled to a channel detector which utilizes a local oscillator and mixers to translate the received signal down in frequency so that simple low pass filters can isolate the desired frequency channel. The outputs of the low pass filters are operated on by a combination of multipliers and differentiators to generate an AM related output and a FM related output. The FM signal output of the channel detector is DC in nature and has an amplitude proportional to the deviation of the received signal frequency from the center frequency of the channel. This signal is used by separation circuitry to ascertain a fault or no-fault condition. The AM output is a DC signal that is proportional to the strength of the received signal and is analyzed to determine if the originally received signal was generated or unacceptably affected by electronic noise. If the noise content does not fall within the predeterminably set limits, any "fault" condition signal is automatically inhibited until the validity of such signal can be ascertained. The detection time for ascertaining whether a valid fault signal has been received can be adjusted to achieve a minimum yet effective detection time. The output of the receiver indicating a fault condition can be utilized to control various circuit breakers in the power transmission system.

6 Claims, 2 Drawing Figures

PROTECTIVE RELAYING MODEM RECEIVER

BACKGROUND OF THE INVENTION

This invention relates to supervisory systems and more particularly to a receiver of a protective relaying modem. Such a system would typically be used with monitors and circuit breakers in a power transmission system to detect and isolate a fault in a particular power transmission line system. Such protective systems have been found advantageous for detecting phase or ground faults in power lines especially when such power lines are located in and span very remote and non-accessible areas.

The detection and subsequent isolation of a faulty power line requires the transmission and reception over some communication medium, of a so-called "trip" signal indicating that a fault has occurred. Under normal or non-fault operating conditions, a second or "guard" signal is transmitted and received as indicative of such operation. Typically the trip and guard signals are the same in amplitude but predeterminably vary in frequency within a designated frequency channel. The equipment which codes the "trip" signal for transmission over the communication channel and decodes the received signal to a "trip" output alarm is called a protective relaying modem.

At the receiving location, the conventional technique has been to pass the received, composite signal through a narrow bandpass L-C filter to reject frequency channels not under consideration, and then utilizing frequency selective circuits such as discriminators, recover the modulation signals. The L-C type filter, in particular, has the disadvantage of being very bulky in size in addition to requiring, for overall frequency stability in the receiver, temperature compensation which is very complex and thus expensive to attain.

An additional problem faced by these prior receivers is that they are always subject to bursts of electronic noise which could generate a pseudo trip condition. The existence of this detrimental noise is dependent upon the particular location and environment in which the receiver is used and the internal characteristics of the receiver itself. It is also known that a receiver's susceptibility to noise is inversely proportional to the amount of time allocated to detect a fault signal before a fault condition is indicated and acted upon. Keeping in mind that it is desired to detect a fault as soon as it occurs, it is clear that for certain environments a shorter detection time can be utilized to render dependable information, while in other so-called noisy environments a longer detection time is required for dependability of detection. The ability of the receiver to efficiently adapt to various noise generating environments has not heretofore been available.

It is, therefore, desirable to provide a communication receiver which dependably detects a trip signal (indicating for example a (phase or ground fault on a power transmission line), is adaptable for efficient use in various noise generating environments and which is susceptible of being placed into operation with as few critically controlling parameters as possible.

SUMMARY OF THE INVENTION

In accordance with the invention, a receiver in a protective relaying modem is provided for receiving and discriminating between two mutually exclusive frequency signals in a given frequency channel. The receiver is preferably used in conjunction with a remote power transmission system and detectors and transmitters coupled thereto to receive and differentiate between one of the received signals which is indicative of a no-fault, i.e., guard condition and the other which is indicative of a fault, i.e., trip condition in the power transmission system.

The receiver includes a channel detector which accepts the incoming signal and, utilizing a local oscillator, and mixers, translates the received signal down in frequency after which the specific frequency channel is isolated by low pass filters. The outputs of the isolation filters are applied, along with their derivatives, to a multiplier assembly which generates a first DC voltage having an amplitude proportional to the received signal strength and a second DC voltage having an amplitude proportional to the amount the frequency of the received signal deviates from the center frequency of the channel. The frequency related signal is applied to a so-called trip/guard separator which is comprised of two window detectors that are effective to identify which one of the two mutually exclusive signals has been received. The output of the trip/guard separator is indicative of whether a trip or a guard signal has been received. A trip signal on the output of the separator activates a trip response circuit which is effective to generate an appropriate control signal for circuit breakers and/or warning devices after an adjustable predetermined period of time. This time period provides the necessary adjustable delay to ensure that a trip signal has not been generated by a random noise burst.

The amplitude related output of the channel detector is scrutinized for the purpose of ensuring that the amplitude falls within certain minimum and maximum thresholds and, in addition, does not have an unacceptable frequency component impressed thereon. Excursions of the signal amplitude outside the threshold and frequency boundaries have been found to be indicative of uacceptable noise content in the received signal and, accordingly, an appropriate signal is generated by associated comparison means that is effective to inhibit the generation of what would possibly be an incorrect trip signal by the trip timing circuit.

BRIEF DESCRIPTION OF THE DRAWINGS

The accompanying drawings illustrate the invention and, by way of example, show a preferred embodiment. In such drawings.

DETAILED DESCRIPTION OF PREFERRED EMBODIMENT

Figure 1:
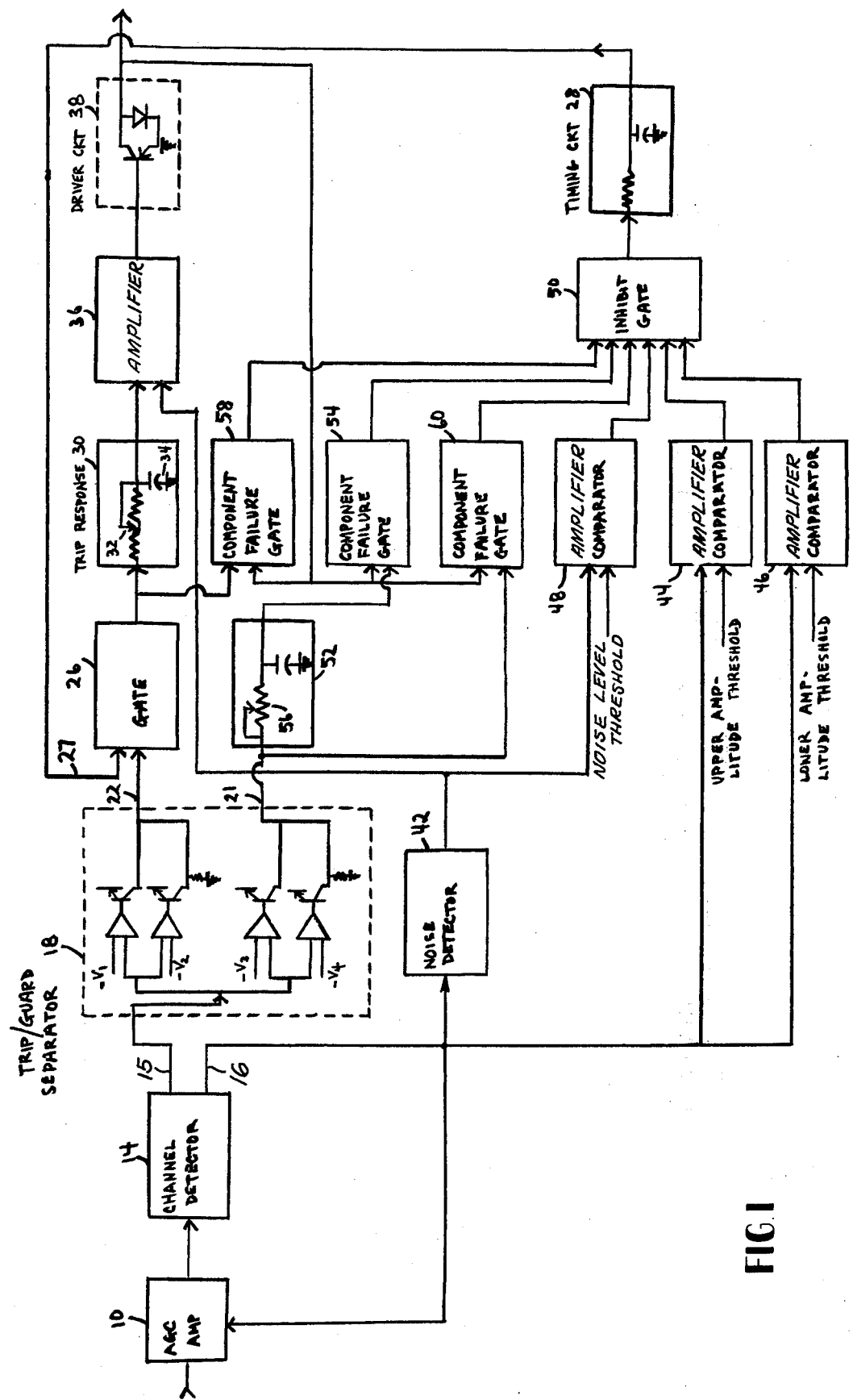
FIG. 1 is a circuit diagram, partially in block form, of a receiver embodiment the invention.

In general, the receiver shown in the drawings monitors a specific frequency channel and determines which one of two mutually exclusive frequencies is being received in that channel. Preferably, this receiver is used to receive signals that are indicative of a fault (trip) or no-fault (guard) condition in a power transmission line. A transmitter is coupled to a fault detector monitoring a particular power transmission line, and the transmitter would be assigned one of several frequency channels in the communication medium. Typically, these channels would be spaced 340 Hz apart. During proper functioning of the power line, the transmitter output would be a continuous tone at its guard frequency. The occurrence of a phase or ground fault in the power line causes the transmitter output tone to shift up or down by a fixed frequency increment to produce what is identified as a trip tone. Detection of this trip tone is made by the receiver and is used to control certain desired functions, such as generating an audible warning signal and/or opening appropriate switch breakers.

In the following detailed description of the receiver and its operation, it will be assumed that the frequency channel to which it is tuned is separated from other frequency shift keyed channels by approximately 340 Hz. Accordingly, the transmitter output at the guard frequency is assumed to be 85Hz from the center frequency of the respective channel, with the trip frequency being displaced 85 Hz on the other side of the center frequency from the guard frequency and thus 170 Hz from the guard frequency.

With reference to FIG.1, an incoming signal is received by an automatic gain control amplifier (AGC) 10 for amplifying and stabilizing the signal for use by the remainder of the receiver. The AGC amplifier permits the received signal to vary in amplitude without affecting the detection function of the receiver since, with the AGC amplifier, the following circuits always operate at a constant signal level.

The output of the AGC amplifier 10 is supplied directly to a channel detector 14 whose outputs 15 and 16 are indicative, respectively, of the frequency modulated (FM) and the amplitude modulated (AM) portions of the signal. This channel detector 14 will be described in detail hereinafter with respect to FIG. 2.

Taking the channel detector outputs in order, the FM portion of the signal contains the information indicating whether a guard condition or a trip condition is being received. More specifically, the FM output 15 of the channel detector 14 is at a first DC voltage level $V_1$ if a guard signal is being received and is at a second DC voltage level $V_2$ if a trip signal is being received. In the preferred embodiment, $V_1$ equals approximately −6 volts DC and $V_2$ is equal to approximately −10 volts DC.

The FM signal output 15 of the channel detector 14 is applied to trip/guard separator 18 which consists, as shown, of four voltage comparators connected to form two window detectors.

The trip/guard separator 18 has two outputs 21 and 22. The first of these outputs 21 is normally at a −16 volt DC level except when a guard signal is detected by the trip/guard separator 18, at which time the output 21 goes to 0 volts. Similarly, the second output 22 is normally at a −16 volt DC level, except when a trip signal is detected which causes this output to go to 0 volts.

When the monitored power line is functioning properly, the trip output 22 of the trip/guard separator 18 is normally at −16 volts thereby causing the remainder of the circuitry in FIG. 1 to remain inactive. However, if a trip signal is received and detected, the trip output 22, in accordance with the above, goes to 0 volts.

This signal is used as the input to a gate 26 which has as its other input 27 a signal from a timing circuit 28 which will be described below.

With a trip signal on its input 22, the output of the gate 26 activates a trip response circuit 30. This circuit 30 is comprised of an adjustable potentiometer 32 and a charging capacitor 34. A trip signal at the output of gate 26 charges the capacitor 34 through the adjustable potentiometer 32. The charging voltage of capacitor 34 is supplied to an amplifier 36. The output of the amplifier 36 is connected to a transistor driver circuit 38 which can be used to activate an audible warning signal (not shown) and/or control an appropriate circuit breaker (not shown).

In operation, the adjustable potentiometer 32 in the trip response circuit 30 controls, via the associated RC time constant, the charging time for the capacitor 34. The capacitor 34 must charge to a predetermined level before the amplifier 36 can be effective in activating the transistor driver circuit 38. It should be quite clear, then, that the particular setting of the potentiometer 32 determines how long a trip signal must be received before the appropriately controlled actions are initiated by the driver circuit 38. In an environment where a lot of electronic noise is present, it would be appropriate to adjust the potentiometer 32 to provide a relatively long charging time for the capacitor 34. In this manner, a trip signal caused by a random noise burst would improbably last long enough to permit the capacitor 34 to charge to the usable level of voltage. The trip response circuit 30 thereby allows an adaptable trade off to be made between the response time and the likelihood that a false trip signal has been generated by a noise burst.

Returning to the channel detector 14, the characteristics of the amplitude modulation signal output 16 should not vary outside reasonable limits, since the information to be retrieved is frequency modulated by the transmitter, not amplitude modulated. However, electronic noise may cause variations in the amplitude of the received signal. It has been found, therefore, desirable to scrutinize any amplitude variations and, if such variations exceed predefined reasonable limits, use such information to inhibit the trip signal as being indicative of an undesirable noise content which makes reliable detection of a trip signal improbable.

The AM output 16 of the channel detector 14, in addition to supplying the necessary feedback to the AGC amplifier 10, is connected to a noise detector 42 and to two comparators 44 and 46.

Since the AM signal content is desirably constant, any variations therein result from the imposition of varying noise levels. The noise detector 42 is a peak to peak detector with a so-called fast attack time and a slow release time. In the preferred embodiment, the attack time is less than one millisecond and the release time is approximately thirty milliseconds. The output of the noise detector 42 is a DC voltage with an amplitude that is proportional to the received noise level and is supplied to a third comparator 48 for comparison with an established and preadjusted noise level threshold.

The other two comparators 44 and 46 respectively compare AM voltage level with a predetermined high level and a predetermined low level. These two comparisons are made to ascertain if the AM signal has risen above or fallen below the anticipated steady level.

The outputs of the three comparators are connected to an inhibiting gate 50 and are effective to cause this gate to generate an inhibit signal on its output when either the noise threshold has been surpassed or the AM signal is above or below the allowable limits.

The output of the noise detector 42 is also applied to the last amplifier 36 in the trip response portion of the circuitry. Since the signal from the noise detector 42 increases or decreases with respect to the amount of noise present, it is used to appropriately adjust the response time of the amplifier 36 to provide, for example, a lengthening of the trip response time if the noise level rises. This operation is an automatic supplement to the manual adjustment of the trip response circuit potentiometer 32. It is used to further define that potentiometer's effect.

With reference again to the trip/guard separator 18, the guard signal output 21 is applied to an RC timing circuit 52. The output of this adjustable timing circuit 52 is applied to a gate 54 along with an input supplied by the output of the trip signal driving circuit 38.

The function of the RC timing circuit 52 is to begin charging when a guard signal disappears on output 21 of the separator 18. After the appropriate amount of charging time, as determined by the setting of the potentiometer 56, a usable input is applied to the gate 54. If, by this time, a trip signal is not also applied to gate 54, the gate signals the inhibit circuit 50 and an appropriate inhibit signal for the system is generated. It should be understood that during normal and proper operation of the receiver, the occurrence of a trip signal and a guard signal are mutually exclusive. It is only, therefore, during the occurrence of a circuit malfunction that the trip and guard signals can both disappear.

With specific reference to the inhibit gate 50, an appropriate input from any one of the three comparators 44, 46 and 48 or from gate 54, cause the inhibit gate 50 to generate an inhibit signal. The inhibit gate 50 also has inputs from two fail-safe gates 58 and 60 which are used as protection against circuit component failures. For example, the two inputs to the first gate 58 come from the trip signal driver circuit output 38 and the first gate 26 which indicates that a trip signal has been detected. It should be clear that noncoincidence between these two signals indicates a problem with one of the components in the circuit.

The second gate 16 also has an input from the trip signal driver circuit 38 and from the third signal output 21 of the trip/guard separator 18 whereby if these two signals both occur at the same time the gate 60 appropriately trasmits a signal to the inhibit gate 50.

The output of the inhibit gate 50 is applied to the briefly mentioned timing circuit 28 whose output is applied to control the first gate 26 in the trip portion of the receiver. In this manner, a trip signal from the trip/guard separator 18 is inhibited after a predetermined amount of time specified by the RC time constant on the timing circuit 28. The delay time provided by the timing circuit 28 ensures that a momentary inhibit, such as would be imposed by a noise burst or the like, does not interfere with a true trip signal that is detected. However, if the inhibit was due to a component failure, such as would be indicated by gates 54, 58 and 60, the timing circuit 28 will have only a very short effect, and the entire receiver will be inhibited until the component failure is corrected.

Figure 2:
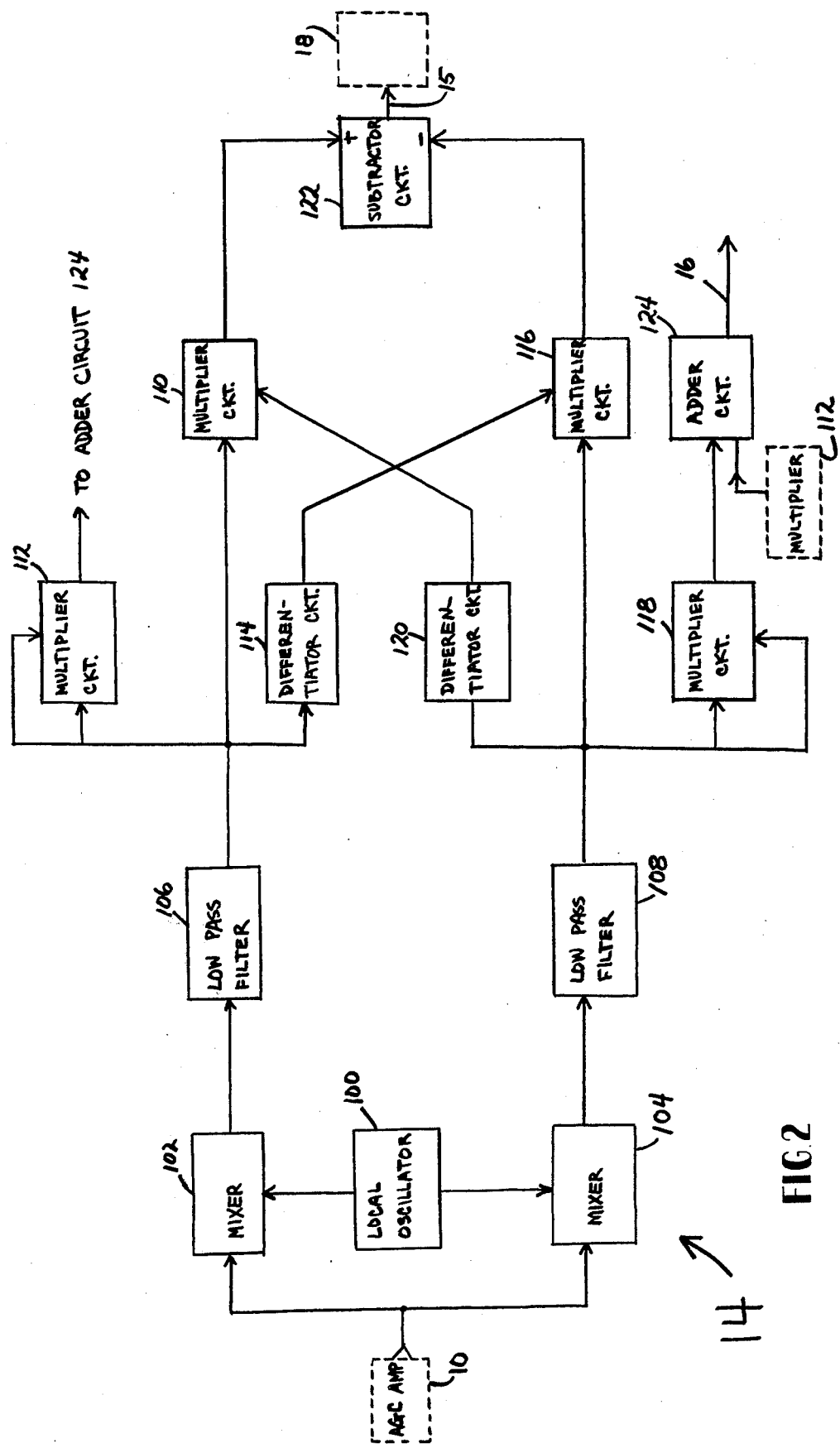
FIG. 2 is a circuit diagram of the channel detector utilized in this invention.

Turning to FIG. 2, channel detector 14, according to the invention, includes a local oscillator circuit 100 which is tuned to the center frequency (fo) of the channel to be received. The oscillator has two output connections coupled respectively to first and second mixer circuits 102 and 104. One of the oscillator outputs represents $SIN\omega_0 t$ and the other represents $\cos \omega_0 t$ where $\omega_0 = 2\pi(f_0)$.

Second input connections to the mixer circuits 102 and 104 originate at the output connection of the AGC amplifier 10. Output connections of the mixer circuits 102 and 104 are coupled to first and second lowpass filters 106 and 108, respectively. These filters can be, due to the use of the local oscillator, loose tolerance, untuned active RC filters.

The output of the first lowpass filter 106 is coupled to a first multiplier circuit 110, a second multiplier circuit 112 and a first differentiator 114. The output of the second lowpass filter 108 is coupled to a third multiplier circuit 116, a fourth multiplier circuit 118 and a second differentiator circuit 120. The first multiplier circuit 110 has a second input coupled to the output of the second differentiator circuit 120, and an output coupled to the first input of a subtractor circuit 122. The third multiplier circuit 116 has a second input coupled to the output of the first differentiator circuit 114 and an output coupled to a second input of the subtractor circuit 122. The output of the second and fourth multiplier circuits 112 and 118 are coupled to the inputs of an adder circuit 124.

In operation, the output signal from the AGC amplifier 10, is an amplified received composite signal, including the desired signal having the form $2a \sin \omega_1 t$, $\omega_1$ being the angular frequency of the desired signal. The composite signal is coupled to the first and second mixer circuits 102 and 104 where it is mixed with quadraturely related components, $SIN\omega_0 t$ and $COS\omega_0 t$ respectively from the local oscillator 100. The output signal from the first mixer circuit 102 includes components of the form $$aCOS(\omega_1-\omega_0)t - aCOS(\omega_1+\omega_0)t \quad (1)$$

while the output signal from the second mixer circuit 104 includes components of the form $$aSIN(\omega_1-\omega_0)t + aSIN(\omega_1+\omega_0)t \quad (2)$$

After passing through the first lowpass filter 106, the signal, as defined in expression (1) has the form $$aCOS(\omega_1-\omega_0)t \quad (3)$$

and similarly the output signal of the second mixer circuit 104, after passing through the second lowpass filter 108, has the form $$aSIN(\omega_1-\omega_0)t \quad (4)$$

The output signal of the first lowpass filter circuit 106 is then directed through the first differentiator circuit 114, where the output signal has the form $$-a(\omega_1-\omega_0)SIN(\omega_1-\omega_0)t \quad (5)$$

to an input connection of the third multiplier circuit 116 where it is multiplied by the output signal (4) from the second lowpass filter 108. The resultant signal at the output connection of the third multiplier 116 has the form $$-a^2(\omega_1-\omega_0)SIN^2(\omega_1-\omega_0)t. \quad (6)$$

Similarly, the output signal from the second lowpass filter circuit 108 is directed through the second differentiator circuit 120, where the output signal has the form $$a(\omega_1-\omega_0)COS(\omega_1-\omega_0)t \quad (7)$$

to an input connection of the first multiplier circuit 10 where it is multiplied with the output signal (3) from the first lowpass filter 106. The resultant signal at the output connection of the first multiplier circuit 110 has the form $$a^2(\omega_1 - \omega_0)\cos^2(\omega_1 - \omega_0)t .\tag{8}$$

The resultant signals (6) and (8) from the third and first multiplier circuits 116 and 110, respectively, are directed to the input connections of the subtractor circuit 122 where they are subtracted to yield the desired signal having the form $$a^2(\omega_1 - \omega_0)t .\tag{9}$$

This signal (9) is the FM output signal 15 from the channel detector which is applied to the trip/guard separator 18.

The output signal (3) from the lowpass filter 106 is also directed to both input connections of the second multiplier circuit 112 where it is squared to yield an output signal of the form $$a^2\cos^2(\omega_1 - \omega_0)t .\tag{10}$$

Similarly the output signal (4) from the second lowpass filter is directed to both input connections of the fourth multiplex circuit 118 where it is squared to yield an output signal of the form $$a^2\sin^2(\omega_1 - \omega_0)t \tag{11}$$

The output signals (10) and (11) of the respective multipliers 112 and 118 are added together in the adder circuit 124 to yield
$a^2 (\sin^2 (\omega_1 - \omega_0)t + \cos^2 (\omega_1 - \omega_0) t)$ which is the AM component of the input signal and is the output signal 16 from the channel detector 14.

The foregoing preferred embodiment description describes a receiver which, as mentioned, has been found advantageous for use in monitoring the functioning of a remote power transmission system. However, it should be understood that the invention encompasses any utilization in which a receiver is used to differentiate between several mutually exclusive frequency signals in a given frequency channel.

I claim:

1. A receiver for receiving and distinguishing between first and second mutually exclusive signal frequencies transmitted in a defined frequency channel of center frequency $f_o$ by remote transmitting means which comprises:
   an input means for receiving a signal that is at said first or said second signal frequency;
   channel detector means turned to the frequency $f_o$ coupled to said input means and generating first and second DC signals appearing at first and second channel detector outputs respectively, said first DC signal being proportional to the difference in frequency between the center frequency $f_o$ and the frequency of the received signal, said first DC signal thereby having either a first or a second DC amplitude, and said second DC signal being proportional to the amplitude of the received signal;
   separator means coupled to said first channel detector output for generating a first separator output signal when said first DC signal is at said first DC amplitude and a second separator output signal when said first DC signal is at said second DC amplitude;
   comparator means coupled to said second channel detector output for generating an output inhibit signal when the amplitude of said second DC signal varies by a predetermined amount;
   gating means coupled to said comparator output and responsive to said inhibit signal, said gating means for inhibiting said first separator output signal; and
   timing means having an input coupled to said separator output, and being responsive only to said first separator output signal, said timing means for generating a control signal after said first separator output signal is present for a predetermined period of time at said timing input, said control signal being operable to control electrical functions external to the receiver.

2. A receiver as in claim 1 wherein said input means further comprises an automatic gain control amplifier providing a received signal of constant power to said channel detector means, said received signal having the form $2a \sin \omega_1 t$, where $2a$ represents the amplitude, $\omega_1$ represents the angular frequency of the received signal, and t represents the time variable.

3. A receiver as in claim 2 wherein said channel detector further comprises:
   a local oscillator generating the quadrature signals $\sin \omega_o t$; $\cos \omega_o t$;
   first and second frequency translating means each coupled to said input means and to said local oscillator, said first frequency translating means producing the output signal a $\cos (\omega_1 - \omega_0)t$ and said second frequency translating means producing the output signal a $\sin (\omega_1 - \omega_0)t$;
   first derivative means responsive to the output signal of said first frequency translating means for producing an output signal proportional to the derivative thereof;
   second derivative means responsive to the output signal of said second frequency translating means for producing an output signal proportional to the derivative thereof;
   first multiplier means responsive to the output signal from said first derivative means and to the output signal from said second frequency translating means for producing an output signal of the form — $a^2 (\omega_1 - \omega_0) \sin^2 (\omega_1 - \omega_0) t$;
   second multiplier means responsive to the output signal from said second derivative means and to the output signal of said first frequency translating means for producing an output signal of the form $a^2 (\omega_1 - \omega_0)\cos^2 (\omega_1 - \omega_0)t$; and
   means for combining the output signals of said first and second multiplier means for producing an output signal of the form $a^2 (\omega_1 - \omega_0)$.

4. A receiver as in claim 3 wherein said comparator means further comprises:
   a first amplitude comparator producing an output signal when the amplitude of said second DC signal exceeds a predetermined upper amplitude threshold; and
   a second amplitude comparator producing an output signal when the amplitude of said second DC signal is below a predetermined lower amplitude threshold.

5. A receiver as in claim 4 wherein said gating means further comprises:
   an OR gate responsive to the output signals from said first and second amplitude comparators for generating said inhibit signal.

6. A receiver as in claim 5 further comprising:
a noise detector responsive to said second DC signal for producing an output signal whose amplitude is proportional to the noise level of said received signal;

a third amplitude comparator responsive to the output signal of said noise detector for producing an output signal when said noise level exceeds a predetermined noise threshold, said output signal from said third comparator coupled to said OR gate.

* * * * *